United States Patent
Wynen et al.

(10) Patent No.: US 6,760,951 B1
(45) Date of Patent: *Jul. 13, 2004

(54) WIPER BLADE FOR CLEANING VEHICLE WINDSCREENS

(75) Inventors: Paul Wynen, Neerpelt (BE); Dirk Herinckx, Drieslinter (BE); Jurgen Roekens, Steenokkerseel (BE)

(73) Assignee: Robert Bosch GmbH, Stuttgart (DE)

( * ) Notice: Subject to any disclaimer, the term of this patent is extended or adjusted under 35 U.S.C. 154(b) by 404 days.

This patent is subject to a terminal disclaimer.

(21) Appl. No.: 09/806,269
(22) PCT Filed: Jul. 19, 2000
(86) PCT No.: PCT/DE00/02351
§ 371 (c)(1),
(2), (4) Date: May 14, 2001
(87) PCT Pub. No.: WO01/08948
PCT Pub. Date: Feb. 8, 2001

(30) Foreign Application Priority Data

Jul. 30, 1999 (DE) .......................................... 199 35 858

(51) Int. Cl.[7] ................................................. B60S 1/38
(52) U.S. Cl. ................................ 15/250.48; 15/250.41; 15/250.4; 15/248; 15/250.361; 15/245
(58) Field of Search .......................... 15/250.41, 250.48, 15/250.4, 250.361, 245

(56) References Cited

U.S. PATENT DOCUMENTS

| 3,021,548 A | | 2/1962 | Stoller | |
| 5,732,436 A | * | 3/1998 | Feigenbaum | .............. 15/250.48 |

FOREIGN PATENT DOCUMENTS

| DE | 30 05 965 A1 | 9/1981 |
| DE | 44 10 446 A | 10/1994 |
| GB | 2 144 976 A | 3/1985 |

* cited by examiner

Primary Examiner—Robert J. Warden, Sr.
Assistant Examiner—Shay Balsis
(74) Attorney, Agent, or Firm—Michael J. Striker

(57) ABSTRACT

A wiper blade for cleaning motor vehicle windows includes a wiper strip (12) which is held by a support bracket system (10) and is encompassed by a laterally closed protective profile (14, 22, 24). The protective profile (14, 22) is closed in the longitudinal direction (38, 40) on at least one end by a cover (16, 18, 20), which can be used to open and close the protective profile (14, 22).

10 Claims, 8 Drawing Sheets

WIPER BLADE FOR CLEANING VEHICLE WINDSCREENS

BACKGROUND OF THE INVENTION

The invention relates to a wiper blade having a wiper strip that is held by a support bracket system and encompassed by a laterally closed protective profile.

Known wipers have a wiper arm, which is comprised of a fastening part that is attached to a drive axle, a hinge part connected to it via a toggle joint, and a wiper rod rigidly connected to the hinge part. The wiper also has a wiper blade with a support bracket system and a wiper strip supported by this support bracket system. The wiper blade is attached to the wiper arm by virtue of the fact that a hook-shaped end of the wiper rod engages between two side walls of the support bracket system and encloses a hinge pin. The resulting hinge guides the wiper blade with the wiper strip over a motor vehicle window, wherein the hinge part and the support bracket system make it possible for the wiper strip to adapt to a curvature of the motor vehicle window. A required pressure of the wiper strip against the motor vehicle window is achieved with at least one tension spring which braces the fastening part and the hinge part together with the wiper rod by means of the toggle joint.

The wiper strip is comprised of an elastomer, e.g. a natural or synthetic rubber, or of ethylene propylene. It has a top strip which is connected via a tilting rib to a wiper lip that rests against the window to be wiped. By means of the tilting rib, the wiper lip can turn over into the opposite direction at a reversal point of the wiping direction, so that it always assumes a favorable angle in relation to the windshield. When the wiper is actuated, the wiper strip sweeps with the wiper lip across the motor vehicle window, wherein the wiper lip gets worn down by friction between itself and the windshield. In addition, environmental influences act on the wiper strip, e.g. temperature fluctuations, UV radiation, salt water, exhaust, etc., which can lead to a premature aging of the material and to an increased wear.

A known strategy for assuring that the wiper strip is in perfect condition when a new motor vehicle is delivered is to cover the wiper strip with a protective profile before the vehicle is conserved. The protective profile is only removed when the new motor vehicle is transferred to a buyer after a final conservation. However, if the windshield becomes soiled or the visibility is hindered by rain during temporary storage of the motor vehicle or during conservation, the windshield cannot be cleaned with the wiper system of the motor vehicle for purposes of maneuvering the vehicle. The protective profile is rigid, hard, and rests only partially against the windshield.

DE 30 05 965 A1 has proposed fastening the longitudinal edge of a flexible band to the side of the protective profile oriented toward the windshield. The protective profile is comprised of hard PVC and the band is comprised of soft PVC. If the wiper is actuated, the band is tilted over, more or less over the length of the wiper blade, and is therefore in a position to adapt to the curvature of the windshield within certain limits. The band functions as a wiper lip, as a result of which the wiper system can be used to clean the windshield during maneuvers without wearing down the actual wiper strip of the wiper blade.

In order to fasten the protective profile to the wiper blade in captive fashion and to protect the wiper strip laterally from environmental influences, another known method is to weld the protective profile shut laterally. To this end, the protective profile is heated at the lateral end faces and is pressed against a plate. This produces a material plate which closes the protective profile. Only one end face can be welded shut before installation. If the second end face is welded shut after the protective profile is slid onto the wiper strip, the protective profile must be cut off in order to be removed.

SUMMARY OF THE INVENTION

According to the invention, a protective profile is closed in the longitudinal direction with a cover on at least one end, which can be used to advantageously open and close the protective profile a number of times for installation and removal. The cover can be slid onto the protective profile and can be fastened to the protective profile by means of a detachable frictionally and/or positively engaging connection. In addition, the cover can be connected to the protective profile in captive fashion and can be fixed in a closed position and/or an open position by means of detent means, for example in a cover, which is connected to the protective profile in captive fashion via a hinge, by means of a rotating motion, or in a cover which is connected to the protective profile via a strip, by means of a straight linear motion, etc.

With the cover according to the invention, the installation and removal are simple and inexpensive. The protective profile can advantageously be closed at both ends without the protective profile having to be destroyed when it is removed. The protective profile can be reused after removal. The cover can be combined with other closures, for example with a welded end, but it is advantageous to close the protective profile with two covers. In one embodiment, the proposal is made to close the protective profile with two covers, which rest against the wiper strip. The protective profile is protected at both ends from environmental influences, is fastened to the wiper strip in captive fashion, and is fixed in both longitudinal directions so that during operation of the wiper, friction and wear between the protective strip and the wiper strip are prevented.

With a cover which has two closing surfaces and a symmetry axis lateral to the longitudinal direction, there are at least two possibilities for installation of the cover, namely rotated by 180° from each other around the symmetry axis. The installation is simplified and the second closing surface can advantageously be used as a grip during removal.

In another embodiment, the proposal is made that the protective profile be closed in the longitudinal direction on at least one end by means of a projection that is directed inward, lateral to the longitudinal direction. The projection can be simply and rapidly produced, for example when the profiles are metal, with a kind of pliers and when the profiles are plastic, with a heat source, and in a particularly advantageous manner, with an ultrasonic source. A protective profile, which has a gap between a second side wall and the projection formed into a first side wall—which gap can be used to guide the wiper strip with a wiper lip during installation and removal, can already be closed by means of two projections at each end when it is manufactured. Assembly steps in the wiper for closing the protective profile are eliminated, the installation time is reduced, and the installation is simplified and cheaper. Additional components, such as covers are eliminated. Furthermore, a protective profile that is closed at both ends can be removed without being destroyed. The protective profile can be reused a number of times, which is good for the environment and reduces the amount of energy consumed, e.g. for recycling.

In order to be able to slide the protective profile onto the wiper strip more easily during installation, in the longitudinal direction toward the end face, the projection has an inwardly inclined bevel which deflects the wiper lip of the wiper strip toward the gap during installation. In the longitudinal direction, the projection has a second, outwardly inclined, advantageously steeper bevel which facilitates a reliable securing of the protective profile to the wiper strip during operation of the wiper and facilitates a damage-free removal by deflecting the wiper lip of the wiper strip into the gap.

The closure with a projection can be combined with other closures, for example a cover or a welded-shut end face. However, it is advantageous to close the protective profile with a projection at both ends. In order to fix the protective profile in both longitudinal directions, the distance between the projections is advantageously equal to the length of the wiper strip. Friction and wear are prevented between the protective strip and the wiper strip.

BRIEF DESCRIPTION OF THE DRAWINGS

Other advantages ensue from the following description of the drawings. Exemplary embodiments of the invention are shown in the drawings. The drawings, the specification, and the claims contain numerous features in combination. The specialist will also suitably consider the features individually and will arrange them in other logical combinations.

DETAILED DESCRIPTION OF THE EMBODIMENTS

Figure 1:
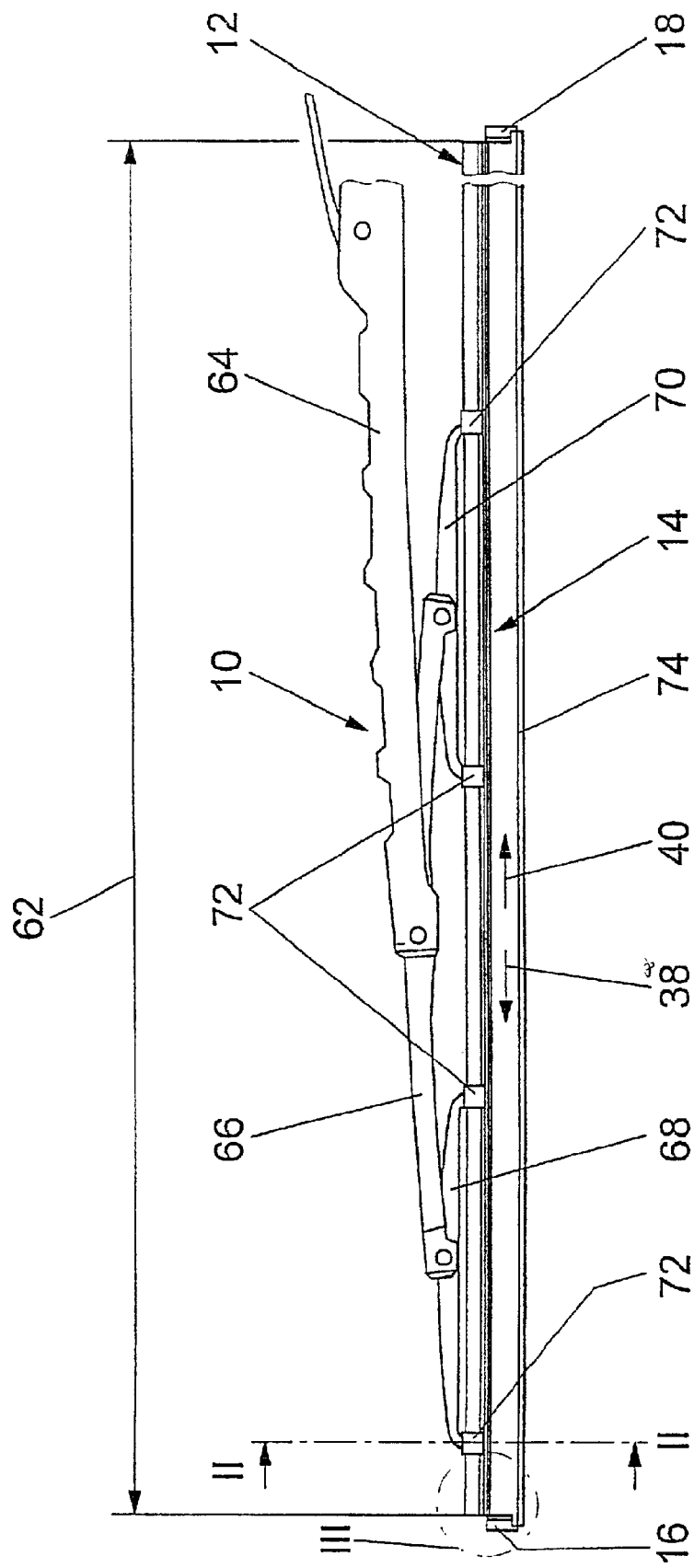
FIG. 1 shows a detail of a wiper blade.

FIG. 1 shows a detail of a wiper blade, which has a support bracket system 10 with a main bracket 64 that is pivotably connected to intermediary brackets 66 whose ends are connected to claw brackets 68, 70. A wiper strip 12 is held by securing claws 72 of the claw brackets 68, 70. In order to protect the wiper strip 12 from heat and other environmental influences before delivery to a buyer, it is encompassed by a protective profile 14 which has a wiper element 74 attached to its side oriented toward the windshield.

Figure 2:
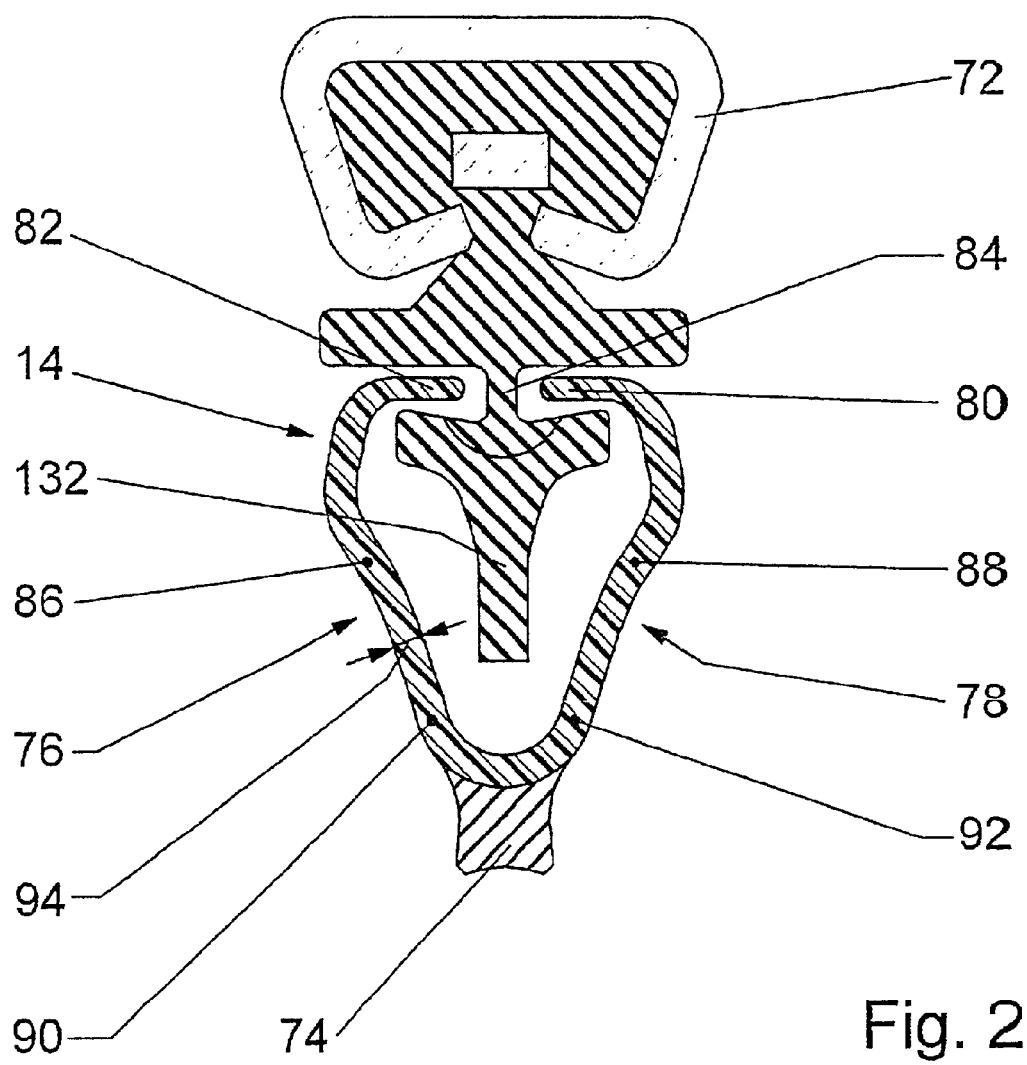
FIG. 2 shows an enlarged section along the line II—II in FIG. 1.

The protective profile 14 is comprised of an elastic plastic, namely polypropylene, and can be adapted to curvatures of the windshield by means of elastic deformation. The protective profile 14 has an elongated hollow profile with two side walls 76, 78 that encompass the wiper strip 12, and is fastened with claw-like projections 80, 82 to the wiper strip 12 in the vicinity of a tilting rib 84 and tapers from the wiper strip 12 toward the windshield (FIG. 2). Each side wall 76, 78 has two turning points 86, 88, 90, 92, which constitute projecting points for an elastic deformation and encourage this deformation. It is also possible for there to be a number of turning points, for example wavy side walls. Furthermore, the elastic deformability is encouraged by means of a profile that is rounded toward the windshield, preferably in the shape of a pear, and by means of a wall thickness 94 of less than 0.8 mm. Advantageously, the wall thickness 94 is uniformly 0.6 mm in the exemplary embodiment shown, but it can be varied.

Figure 3:
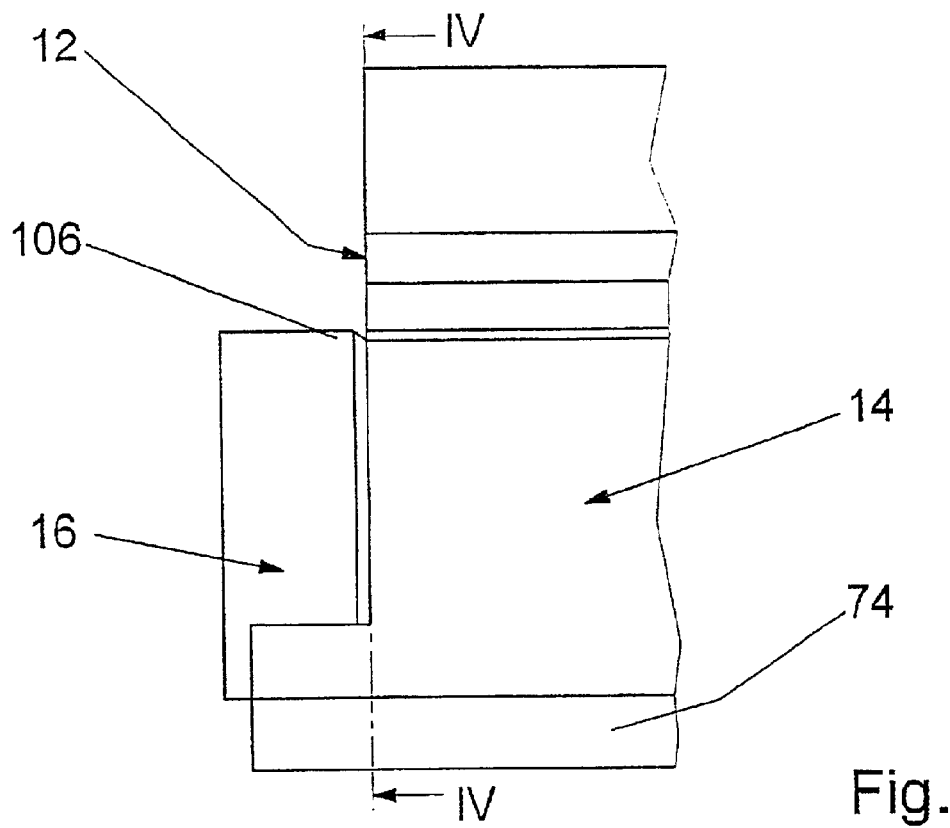
FIG. 3 shows an enlarged view of a detail III in FIG. 1.
Figure 4:
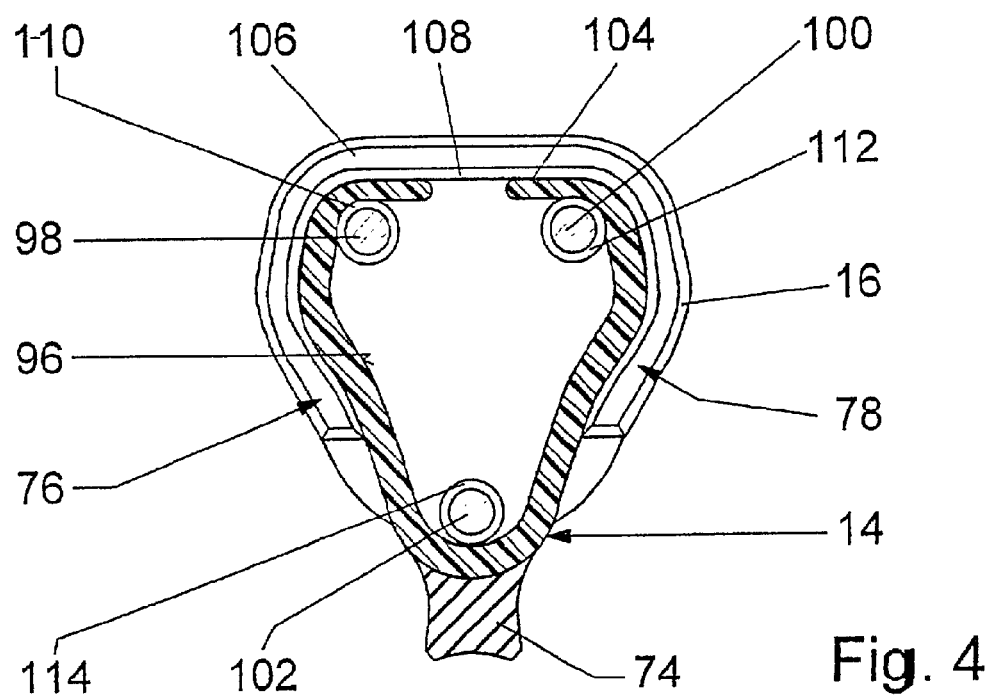
FIG. 4 shows a section along the line IV—IV in FIG. 3.
Figure 5:
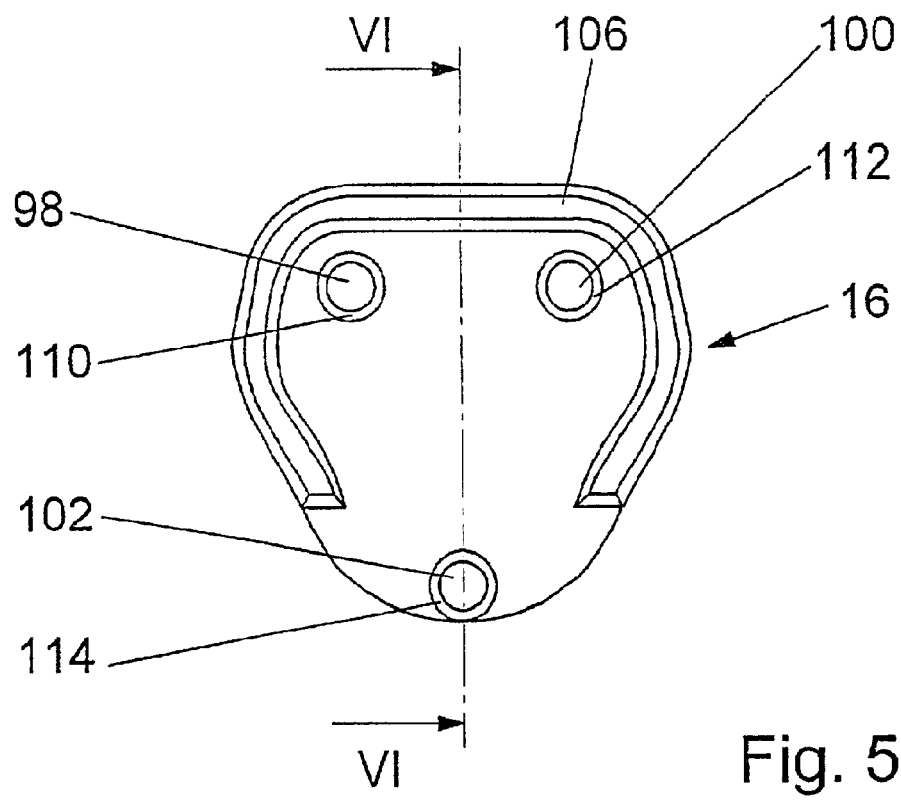
FIG. 5 shows a cover.
Figure 6:
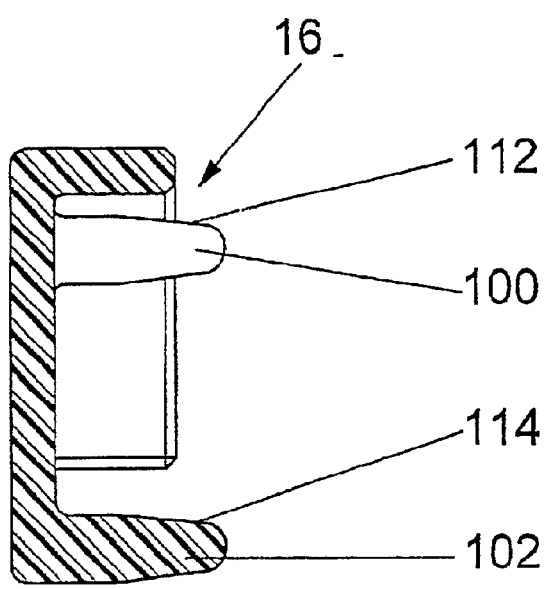
FIG. 6 shows as section along the line VI—VI in FIG. 5.

FIG. 3 shows an enlarged detail III in FIG. 1. The protective profile 14 is closed at both ends in the longitudinal direction 38, 40 by a plastic cover 16, 18. The covers 16, 18 are slid onto the protective profile 14 and are detachably connected to it with frictional engagement by means of three pins 98, 100, 102 that rest against the inside 96 of the protective profile 14 and by means of a collar 106 disposed on the cover side 104 of the protective profile 14 (FIGS. 4, 5, and 6). In order to be able to easily mount or slide the covers 16, 18 onto the protective profile 14, the collar 106 and the pins 98, 100, 102 have phases 108, 110, 112, 114. The covers 16, 18 can be taken off the protective profile 14 for its removal.

The protective profile 14 is fastened to the wiper blade in captive fashion, the wiper strip 12 is protected laterally from environmental influences, and the protective profile 14 is easy to install and remove with the covers 16, 18. In particular, a protective profile 14 that is closed at both ends can be reused with at least one cover 16 or 18 after being removed. In order to prevent the protective profile 14 from moving on the wiper strip 12 during operation of the wiper and causing friction and wear, the covers 16, 18 rest with the collar 106 against the wiper strip 12 and fix the protective profile in both longitudinal directions 38, 40 (FIGS. 1 and 3). The elasticity of the protective profile 14 is only affected to an insignificant degree by the covers 16, 18, which rest only partially against the protective profile 14. The side walls 76, 78 can be deflected inward when there is an elastic deformation of the protective profile 14, without being hindered by the covers 16, 18 (FIG. 4).

Figure 7:
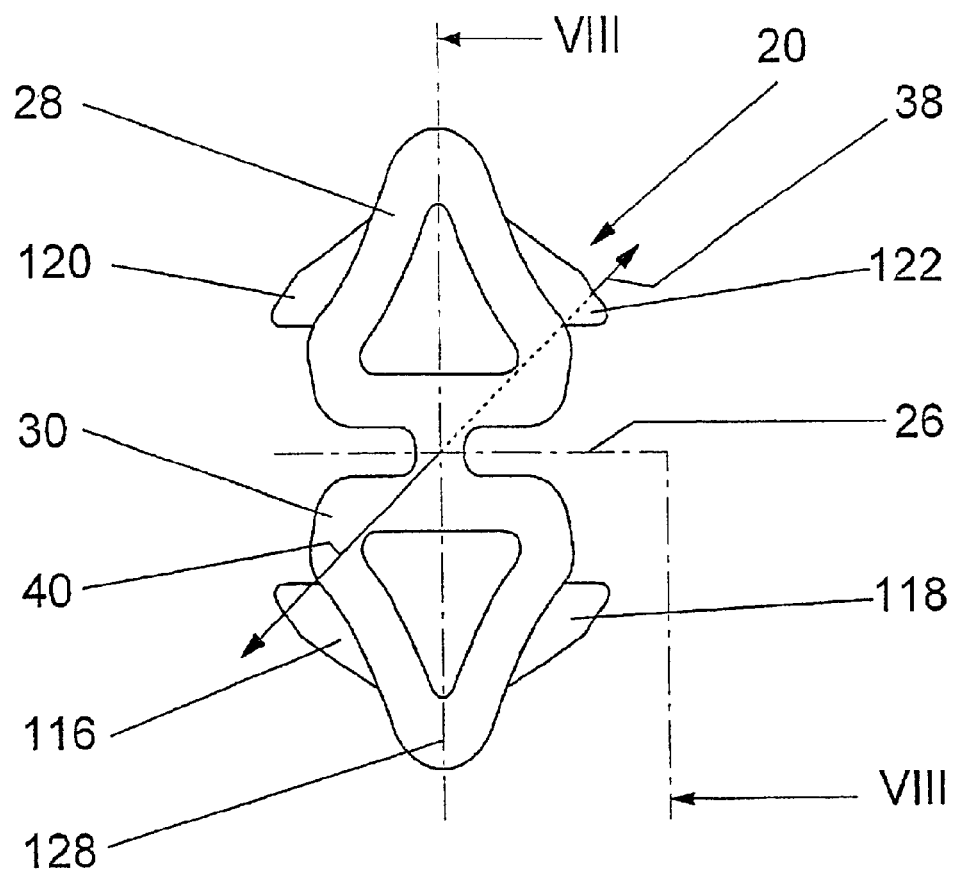
FIG. 7 shows a variant on FIG. 5.
Figure 8:
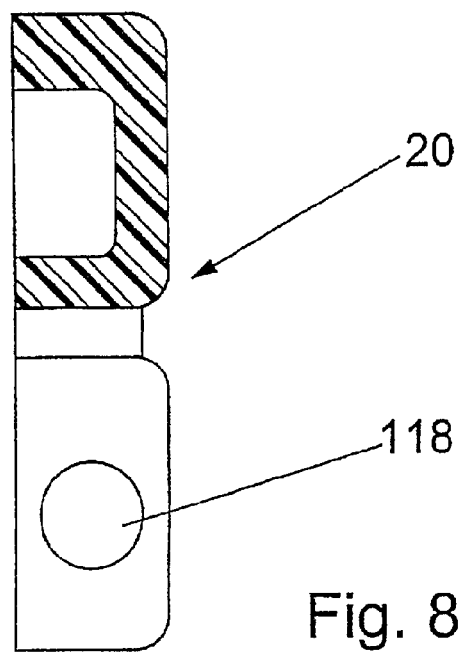
FIG. 8 shows a section along the line VIII—VIII in FIG. 7.
Figure 9:
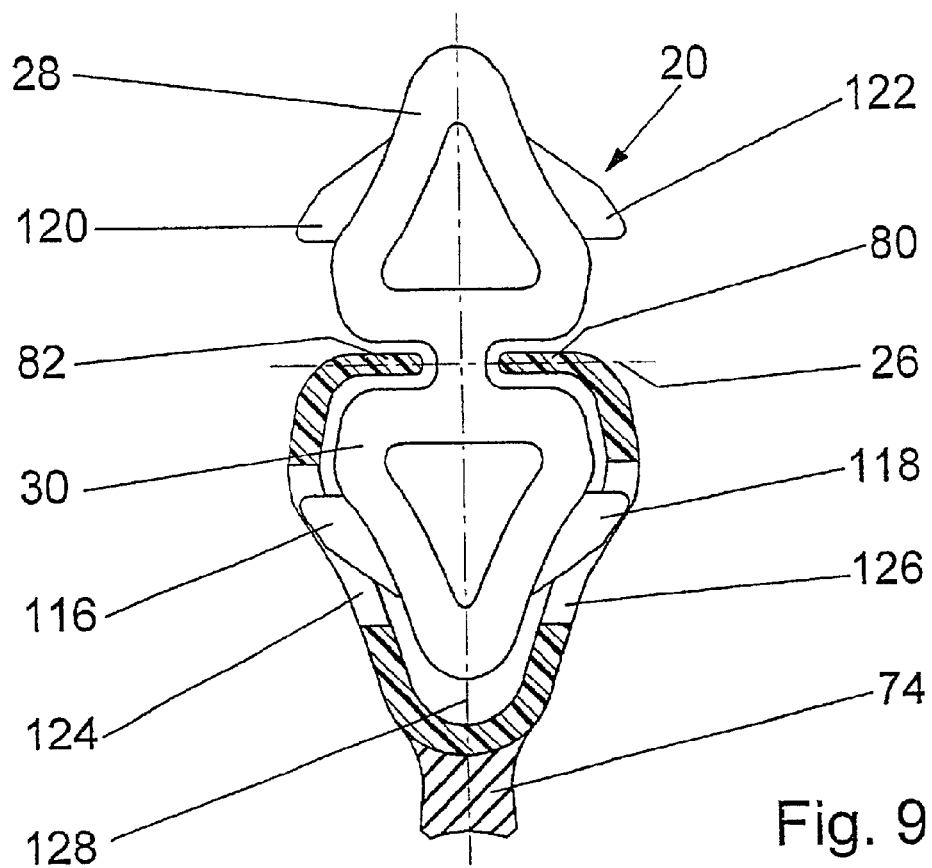
FIG. 9 shows a cover according to FIG. 7 when installed.
Figure 10:
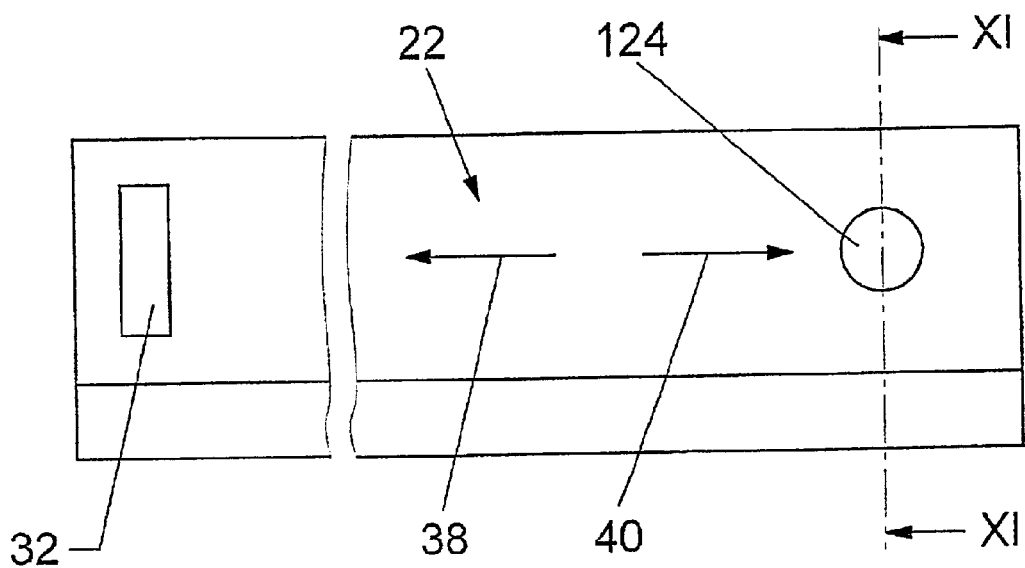
FIG. 10 shows a variant of a protective profile according to FIG. 1.
Figure 11:
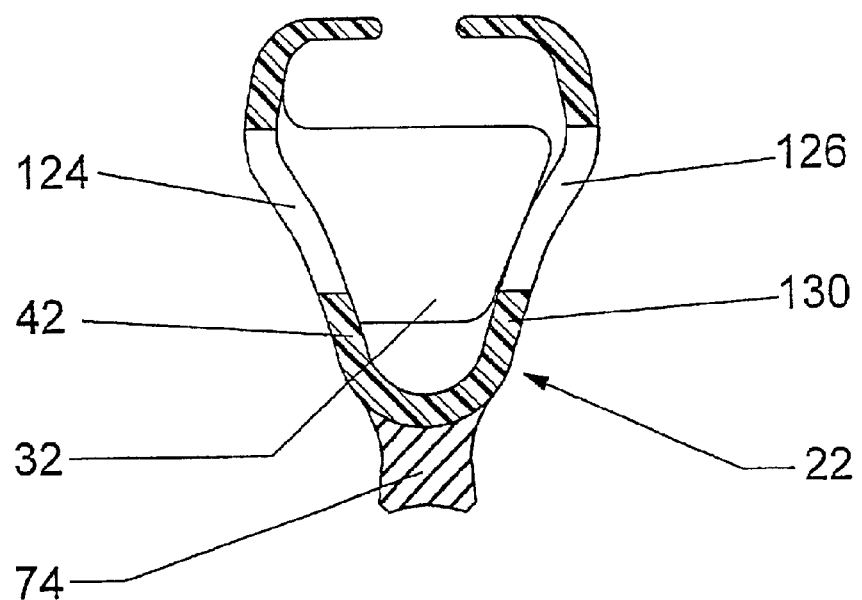
FIG. 11 shows a section along the line XI—XI in FIG. 10.

FIGS. 7, 8, and 9 show a cover 20, which in addition to a frictional engagement, is detachably fastened by means of pins 116, 118, 120, 122 in openings 124, 126 in side walls 42, 130 of a protective profile 22 (FIGS. 10 and 11). The cover 20 has a symmetry axis 26 lateral to the longitudinal direction 38, 40, a symmetry axis 128 perpendicular to the longitudinal direction 38, 40, and two closing surfaces 28, 30 which are respectively matched to the cross sectional geometry of the protective profile 22. The cover 20 can be respectively rotated around the symmetry axes 26, 128 by 180° and can therefore be installed in four different ways. The installation is simplified and the second closing surface 28 or 30 protruding beyond the protective profile 22 can advantageously be used as a grip during removal.

The protective profile 22 can be closed in the longitudinal direction 40 by the cover 20 and is closed in the longitudinal direction 38 at a second end with a projection 32 that is oriented lateral to the longitudinal direction 38, 40 (FIG. 10). The protective profile 22 is made of plastic and the projection 32 is let into the side wall 42 with an ultrasonic source and protrudes until it reaches to the second side wall 130.

Figure 12:
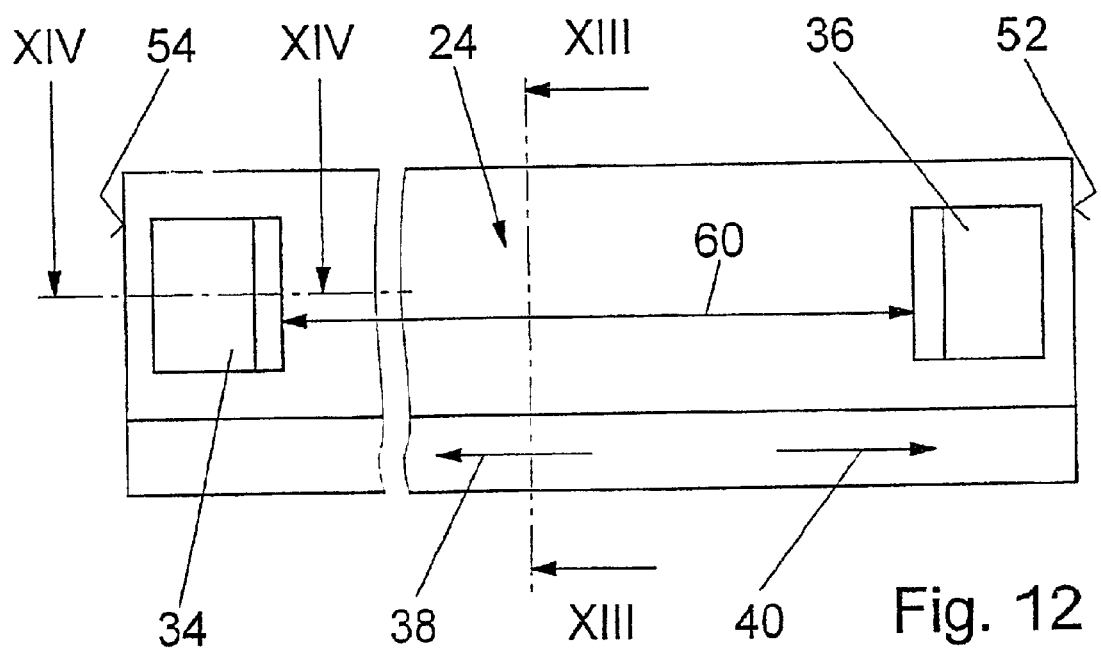
FIG. 12 shows a variant of a protective profile according to FIG. 10.
Figure 13:
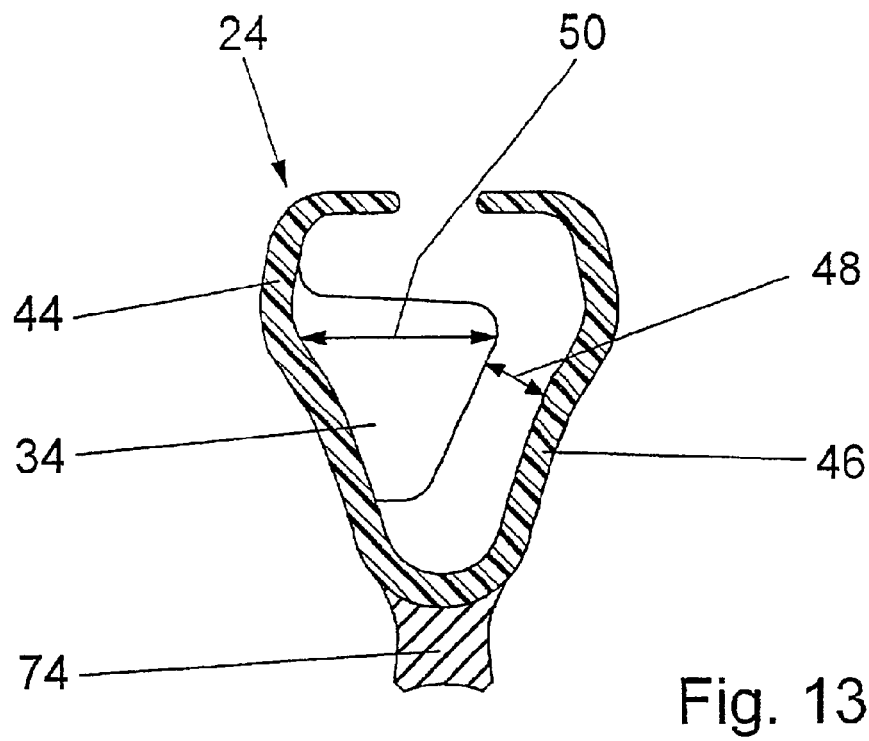
FIG. 13 shows a section along the line XIII—XIII in FIG. 12.
Figure 14:
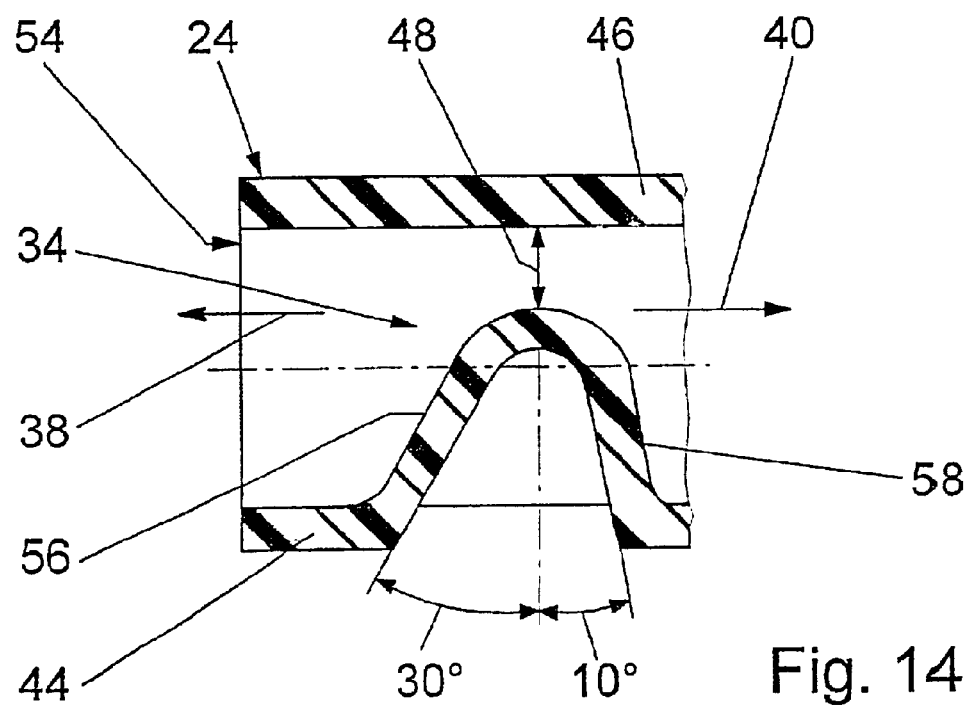
FIG. 14 shows a section along the line XIV—XIV in FIG. 12.

FIGS. 12, 13, and 14 show a protective profile 24, which is closed in the longitudinal direction 38, 40 at both of its ends by means of projections 34, 36, which are let into a side wall 44 and are directed inward lateral to the longitudinal direction 38, 40. The projections 34, 36 are formed into the side wall 44 of the plastic protective profile 24 with an ultrasonic source or ultrasound waves.

The length 50 of the projection 34 decreases toward the windshield in such a way that an approximately uniform gap 48 is produced between the projection 34 and a second side r wall 46, and this gap can be used to guide the wiper strip 12 with a wiper lip 132 (FIG. 2) without damaging it during installation and removal (FIGS. 13 and 14). The projection 34 tapers lateral to the longitudinal direction 38, 40 and, oriented toward the end face 54, has an inwardly inclined first, flatter bevel 56 of 30°, which deflects the wiper lip 132 of the wiper strip 12 toward the gap 48 during installation and facilitates installation (FIG. 14). In the longitudinal direction 40 toward the inside, the projection 34 also has a second, outwardly inclined, steeper bevel 58 of 10°, which assures a secure fastening of the protective profile 24 to the wiper strip 12 during the operation of the wiper and facilitates a non-damaging removal.

The projection 36 is the same shape as the projection 34, with a flatter bevel, not shown in detail, toward the end face 52 and a steeper bevel toward the inside. The projections 34, 36 are disposed at a distance 60 from each other, which is equal to a length 62 of the wiper strip 12 (FIGS. 12 and 1). Friction between the protective profile 24 and the wiper strip 12 is prevented and the protective profile 24 is fastened to the wiper blade in a captive, reusable fashion. Furthermore, the wiper strip 12 is protected laterally from environmental influences. The projections 34, 36 extend over only a small part of the circumference of the protective profile 24 so that the elastic deformability is only impaired to an insignificant degree.

Reference Numerals 10 support bracket system
12 wiper strip
14 protective profile
16 cover
18 cover
20 cover
22 protective profile
24 protective profile
26 symmetry axis
28 closing surface
30 closing surface
32 projection
34 projection
36 projection
38 longitudinal direction
40 longitudinal direction
42 side wall
44 side wall
46 side wall
48 gap
50 length
52 end face
54 end face
56 bevel
58 bevel
60 distance
62 length
64 main bracket
66 intermediary bracket
68 claw bracket
70 claw bracket
72 securing claws
74 wiper element
76 side walls
78 side walls
80 projection
82 projection
84 tilting rib
86 turning point
88 turning point
90 turning point
92 turning point
94 wall thickness
96 inside
98 pin
100 pin
102 pin
104 cover side
106 collar
108 phase
110 phase
112 phase
114 phase
116 pin
118 pin
120 pin
122 pin
124 opening
126 opening
128 symmetry axis
130 side wall
132 wiper lip

What is claimed is:

1. A wiper blade for cleaning motor vehicle windows, comprising a wiper strip (12), wherein said wiper strip is held by a support bracket system (10) and is encompassed by a laterally closed protective profile (14, 22, 24), wherein the protective profile (14, 22) is closed in the longitudinal direction (38, 40) on at least one end by a cover (16, 18, 20), said cover can be used to open and close the protective profile (14, 22), and the cover is positioned on a front side on the protective profile a projection (32, 34, 34) that is directed inward, lateral to the longitudinal direction (38, 40), and wherein the projection (32, 34, 36) is let into a first side wall (42, 44) of the protective profile (22, 24), and between the projection (34) and a second side wall (46), the protective profile (24) has a gap (48), which can be used to guide the wiper strip (12) with a wiper lip (132) during installation and removal.

2. The wiper blade according to claim 1, characterized in that wherein the protective profile (14) is closed with two covers (16, 18).

3. The wiper blade according to claim 1, wherein the cover (16, 18, 20) rests against the wiper strip (12).

4. The wiper blade according to claim 1, wherein the cover (20) has two closing surfaces (28, 30) and has a symmetry axis (26) lateral to the longitudinal direction (38, 40).

5. The wiper blade according to claim 1, wherein the length (50) of the projection (34) decreases toward the window and the gap (48) is embodied as approximately uniform in width.

6. The wiper blade according to claim 5, wherein the longitudinal direction (38) toward the end face (54), the projection (34) has a bevel (56), which is inclined inward in the longitudinal direction (40) and deflects the wiper lip (132) of the wiper strip (12) toward the gap (48) during installation.

7. The wiper blade according to claim 6, wherein the inwardly inclined bevel (56) is flatter than an outwardly inclined bevel (58).

8. The wiper blade according to claim 5, wherein in the longitudinal direction (40) toward the inside, the projection (34) has a bevel (58), wherein said bevel is inclined outward in the longitudinal direction (38) and deflects the wiper lip (132) of the wiper strip (12) toward the gap (48) during removal.

9. A wiper blade for cleaning motor vehicle windows, comprising a wiper strip (12), wherein said wiper strip is held by a support bracket system (10) and is encompassed by a laterally closed protective profile (14, 22, 24), wherein the protective profile (14, 22) is closed in the longitudinal direction (38, 40) on at least one end by a cover (16, 18, 20), said cover can be used to open and close the protective profile (14, 22), the cover is positioned on a front side on the protective profile wherein the protective profile (24) has two projections (34, 36) whose distance (60) from each other is equal to the length (62) of the wiper strip (12).

10. A wiper blade for cleaning motor vehicle windows, comprising a wiper strip (12), wherein said wiper strip is held by a support bracket system (10) and is encompassed by a laterally closed protective profile (14, 22, 24), wherein the protective profile (14, 22) is closed in the longitudinal direction (38, 40) on at least one end by a cover (16, 18, 20), said cover can be used to open and close the protective profile (14, 22), the cover is positioned on a front side on the protective profile, and wherein the protective profile a projection (32, 34, 34) that is directed inward, lateral to the longitudinal direction (38, 40), (22, 24) is made of plastic and the projection (32, 34, 30) is produced with an ultrasonic source.

* * * * *